UNITED STATES PATENT OFFICE 2,485,308

TREATING BUTTERFAT

Charles E. North, Montclair, N. J.

No Drawing. Application September 20, 1946,
Serial No. 698,405

6 Claims. (Cl. 99—120)

This invention relates to the treatment of butter fat and involves particularly the treatment of such fat which has become rancid.

When butter fat is stored for long periods of time it often develops a disagreeable odor or unpalatable taste or both. These effects have been attributed, at least in part, to the action of oxygen (in the atmosphere) on such fat and also partly to the action of bacteria or of enzymes in the fat. Apparently, oxygen reacts with the fat, or with some constituents thereof, to form compounds such as peroxides, aldehydes and fatty acids. These reaction products are said to be responsible for the aforementioned undesirable properties. Another possible cause of rancidity is the action of some of the enzymes present in the fat. These may bring about or accelerate hydrolysis of butter with the accompanying development of fatty acids which often are considered the sources of a disagreeable odor or taste. If butter is kept, for example, in open containers such as tubs then these undesired changes may occur in a relatively short time, and the fatty material is described as being rancid.

Various precautions, such as cold storage of the fat or storing it in air-tight containers in which the air has been displaced by nitrogen, have been taken in efforts to prevent or to delay the development of rancidity. However, in spite of such precautions, rancidity of the fat does occur in many instances, as for example, due to faulty sealing of air-tight containers and subsequent leakage of air into them.

One object of my invention is to provide a method of treating rancid butter fat whereby said fat again becomes palatable in taste and loses its disagreeable odor. It is also an object of this invention to provide a method whereby this renovation of rancid butter fat can be accomplished with the minimum loss of fat. Another object of my invention is to effect renovation of rancid butter fat with the aid of only those substances or materials which initially occur with butter and which have been separated from the fat during processing of the latter.

In performing my invention, I make an emulsion of the rancid fat, skim milk powder and water. It is necessary that this operation be conducted at a temperature which is equal to or exceeds the melting point of the fat so that the latter will be maintained in a molten state. As butter fat melts at approximately 96° F. and water boils at 212° F., emulsification of the fat is effected within this temperature range. After the fat is emulsified completely, the emulsion is diluted with water until the fat content is 30 to 40 per cent by weight. In this manner a fat-containing composition is obtained which has the consistency and proportion of fat of a whipping cream. The emulsion then is cooled to a churning temperature, say 45° F. to 55° F., and afterwards subjected to a churning operation whereby the emulsified fat particles are agglomerated and separate as solid pieces of butter fat. Next, the agglomerated fat is washed with cold water to remove any adhering liquid material. If desired, the washed fat may be melted and then centrifuged whereby a substantially anhydrous form of butter fat (i. e., milk oil) is prepared.

Cooling of the emulsion can be effected in any convenient manner with external cooling means. As a modification of my process, instead of using external cooling means I may add ice or a mixture of ice and water to the heated emulsion in sufficient quantity not only to cool the emulsion but also to dilute it (due in part to water formed by melting of the ice) to the appropriate concentration of fat. Another variation consists in making an emulsion of the fat and keeping its proportion within the limit of 30 to 40 per cent, thereby rendering unnecessary any dilution of the emulsion with water.

It will be understood that in preparing the emulsion of butter fat the necessary quantity of water may be substituted in whole or in part by sweet skim milk, since the latter is essentially an aqueous solution of skim milk powder (or milk solids not fat). Whenever skim milk is employed it is necessary, of course, to take into account the amount of milk solids not fat (in the milk) and to make allowance for such when estimating the quantity of skim milk powder to be used.

The following illustration discloses one procedure whereby I may obtain renovated butter fat. To some rancid melted fat was added about ⅕ its weight of skim milk powder, and these two ingredients were mixed well by being rubbed together (while maintaining the fat in a molten state) until a thick, viscous, dough-like mass was obtained. Then, while working or rubbing this mass, boiling water was added slowly until a paste-like composition resulted. To the latter were added melted butter fat and skim milk powder, and these were incorporated into the paste-like mass until a thick, viscous, dough-like mass again was formed. Next, hot water was incorporated into the mass as indicated previously. These operations were repeated successively until there was prepared an emulsion consisting of 500 g. of melted rancid fat, 100 g. of skim milk powder and 200 g. of water.

The emulsion was cooled and diluted simultaneously by adding a mixture of ice and water to it and the resulting liquid composition (while kept cool) was stirred vigorously until butter granules were formed. The latter were drained from the butter milk, washed well with cold water, and then pressed to extrude as much as possible of the entrained water.

The following examples will further illustrate my invention and all proportions given therein are by weight. All tests mentioned in these examples are merely indicative of the renovation of fat secured by the treatments described and are not to be taken as limiting the scope of such treatments.

Example 1.—In this instance the proportions of ingredients were: 15 parts of rancid butter fat, 2 parts of skim milk powder and 24 parts of water. Some of the fat was melted and while maintained at a temperature of about 150–160° F. some of the powder was admixed with it and then thoroughly incorporated by grinding. To the resulting thick dough were added in small portions from time to time some more fat and powder and also some water until a thick emulsion was obtained. Afterwards, water was incorporated into the emulsion until the above indicated proportion was added. The emulsion was cooled to about 50° F. and on rapidly churning solid particles of butter fat soon were formed. After these were separated from the butter milk, the solids were washed several times with cold water and then worked to eliminate as much water as possible.

The treated butter possessed only a very slight odor. The original, untreated fat had a very marked typical rancid odor.

The untreated butter fat was tested for peroxides in the following manner: A small quantity of fat was melted and to this was added an equal volume of glacial acetic acid. After mixing, the liquids were allowed to separate and were cooled somewhat and then a few cubic centimeters of a concentrated aqueous solution of potassium iodide containing a small amount of dissolved starch were added to the acetic acid. A very deep characteristic iodine-starch color developed almost immediately.

When a portion of the treated butter fat was tested in the same manner, the iodine-starch color developed after the mixture under test stood for a short time. This observation indicated that a substantial proportion of the peroxides in the original fat had been eliminated.

Example 2.—Rancid butter fat was emulsified and the resulting emulsion churned as indicated in Example 1. In this case, however, the proportions of materials were: 10 parts of butter fat, 3 parts of skim milk powder and 19 parts of water. The renovated fat, after draining off the butter milk, was washed twice with warm water, and after each washing the mixture of fat and water was cooled in order to solidify the butter. After the second washing, the fat was worked to eliminate as much entrained water as possible.

The untreated fat possessed a strong, disagreeable rancid odor, but the treated fat was substantially free of any unpleasant odor.

When tested for peroxides, as indicated in Example 1, the untreated fat gave a positive test almost immediately. The treated sample, on the other hand, developed a test very slowly thus indicating that most of the peroxides had been removed because of the treatment.

It will be seen from the foregoing disclosures that my invention involves making an emulsion of rancid butter fat, skim milk powder and water, diluting said emulsion with water until its fat content is that of whipping cream, then cooling the diluted emulsion to a temperature at which it can be churned, churning the cooled emulsion until butter is formed, and afterwards washing the butter substantially free of adhering liquids.

In making the emulsion I seek to effect as intimate contact as is possible between the fat and the skim milk powder. The first step consists in grinding the melted liquid butter fat with the solid skim milk powder until the fat is adsorbed by the solid as completely as possible. This operation results in the formation of a very viscous dough-like mass. The second step consists in admixing this mass with sufficient hot water to convert the powder into a hydrophilic colloid. The third step consists in grinding or rubbing the warm mixture of hydrophilic colloid and fat whereby the fat globules are ruptured and become smaller and smaller in size until their dimensions are equal to those of fat globules in natural cream. When this occurs the fat has become dispersed completely throughout the hydrophilic colloid and an emulsion of fat, skim milk powder and water is obtained. Afterwards, this emulsion is diluted with water until its concentration of emulsified fat is such that the fat particles are agglomerated and then separate as butter granules from the aqueous liquid when the emulsion is cooled and churned.

The proportions by weight of the various ingredients used in making the emulsions may be varied considerably. If the weight of skim milk powder be taken as unity, i. e., as 1, then the proportion of fat may vary from about 2 to about 20. In many instances a proportion of about 5 to 10 will be suitable. The proportion of water may vary from about 2 to about 10 and often a suitable proportion will fall within the range of 3 to 5. In other words, I seek to prepare an emulsion which contains 30 to 40 per cent or more of butter fat and which resembles natural cream in its properties. My emulsion can be churned after cooling to furnish granules of renovated butter fat. If its fat content is greater than 30 to 40 per cent, then (as previously mentioned) the emulsion should be diluted with water to give this proportion of fat prior to the cooling and churning steps.

I prefer to employ dry milk powders made from sweet skim milk as such powders contain only a small percentage of fat. Moreover, such powders should be readily soluble in water, should be substantially devoid of any cooked, burnt or other disagreeable taste or flavor, and should possess the property of uniting or emulsifying with butter fat. One powder which is suitable for my purpose and the method of preparing it have been described in my copending application Ser. No. 674,980.

It should be understood that my process is applicable only to the renovation of butter which has become rancid, that is fat which is unpleasant to the taste and which possesses an unpleasant odor. I do not include in my invention such fatty material in which oxidation or decomposition reactions have proceeded to such a degree or extent as to render it unfit for human consumption. I do not wish to limit my process to only one treatment of the rancid fat, as in some instances it may require say two successive treatments in order to eliminate the disagreeable effects due to rancidity.

By the term butter fat I mean those fats which are found in milk or cream. Such fats when subjected to my process may be in the form of butter which usually contains some water, say 10 to 12 per cent, or in the form of milk oil which is substantially anhydrous or free of water.

What I claim is:

1. The method of renovating rancid butter fat which comprises emulsifying rancid butter fat by alternately admixing it in the molten state with skim milk powder until a viscous dough-like mass is obtained and admixing water while maintaining said viscous mass and said water at a temperature of about the melting point of said fat and the butter fat in a molten state, said emulsion having the consistency and fat content of whipping cream, cooling said emulsion to a churning temperature, churning said emulsion while maintaining it in a cooled condition until said emulsified fat is agglomerated, and separating said agglomerated fat from adhering liquid.

2. The method of renovating rancid butter fat which comprises emulsifying rancid butter fat by alternately admixing it in the molten state with skim milk powder until a viscous dough-like mass is obtained and admixing water with and grinding said viscous mass until it becomes paste-like in consistency and the sizes of the fat globules decrease until substantially equal to those in natural cream while maintaining said viscous mass and said water at a temperature of about the melting point of said fat and the butter fat in a molten state, the proportion of said fat in said emulsion being greater than that in whipping cream, diluting said emulsion with water until its fat content is about that of whipping cream, cooling said diluted emulsion to a churning temperature, churning said diluted emulsion while maintaining it in a cooled condition until said emulsified fat is agglomerated, and separating said agglomerated fat from adhering liquid.

3. The method of renovating rancid butter fat which comprises emulsifying rancid butter fat by alternately admixing it in the molten state with skim milk powder until a viscouse dough-like mass is obtained and admixing water with and grinding said viscous mass until it becomes paste-like in consistency and the sizes of the fat globules decrease until substantially equal to those in natural cream while maintaining said viscous mass and said water at a temperature of about the melting point of said fat and the butter fat in a molten state, diluting said emulsion until the proportion of said fat in said emulsion is not less than about 30 per cent and not more than about 40 per cent, cooling said diluted emulsion to a temperature not less than about 45° F. and not more than about 55° F., churning said diluted emulsion while maintaining it in a cooled condition until said emulsified fat is agglomerated, and separating said agglomerated fat from adhering liquid.

4. The method of renovating rancid butter fat which comprises emulsifying rancid butter fat by alternately admixing it in the molten state with skim milk powder until a viscous dough-like mass is obtained and admixing water with and grinding said viscous mass until it becomes paste-like in consistency and the sizes of the fat globules decrease until substantially equal to those in natural cream while maintaining said viscous mass and said water at a temperature of about the melting point of said fat and the butter fat in a molten state, the proportion of said fat in said emulsion being not less than about 30 per cent and not more than about 40 per cent, cooling said emulsion to a temperature not less than about 45° F. and not more than about 55° F., churning said emulsion while maintaining it in a cooled condition until said emulsified fat is agglomerated, and separating said agglomerated fat from adhering liquid.

5. The method of renovating rancid butter fat which comprises emulsifying rancid butter fat by alternately admixing it in the molten state with skim milk powder until a viscous dough-like mass is obtained and admixing water with and grinding said viscous mass until it becomes paste-like in consistency and the sizes of the fat globules decrease until substantially equal to those in natural cream while maintaining said ingredients and said viscous mass at a temperature not less than about 96° F. and not more than about 212° F., the proportion of said fat in said emulsion being greater than about 40 per cent, diluting said emulsion with water until its fat content is not less than about 30 per cent and not more than about 40 per cent, cooling said diluted emulsion to a temperature not less than about 45° F. and not more than about 55° F., churning said diluted emulsion while maintaining it in a cooled condition until said emulsified fat is agglomerated, and separating said agglomerated fat from adhering liquid.

6. The method of renovating rancid butter fat which comprises intimately admixing dry skim milk powder with melted rancid butter fat until all of said fat is adsorbed by said powder and a viscous dough-like mass is obtained, while maintaining said viscous mass at a temperature not less than about 96° F. and not more than about 212° F. adding water heated to the same temperature to said powder and adsorbed fat until said powder is changed into a hydrophilic colloid and said viscous mass becomes paste-like in consistency, mechanically agitating this mixture of molten fat and hydrophilic colloid until said fat is emulsified and the sizes of the fat particles decrease until substantially equal to those in natural cream, diluting said emulsion with water until the proportion of fat is about that of whipping cream, cooling said diluted emulsion to a churning temperature, churning said diluted emulsion while maintaining it in a cooled condition until said emulsified fat is agglomerated, and separating said agglomerated fat from adhering liquid.

CHARLES E. NORTH.

REFERENCES CITED

The following references are of record in the file of this patent:

UNITED STATES PATENTS

| Number | Name | Date |
| --- | --- | --- |
| 797,481 | White | Aug. 15, 1905 |
| 856,353 | Martin et al. | June 11, 1907 |
| 1,090,210 | Heller | Mar. 17, 1914 |

OTHER REFERENCES

"The Butter Industry," by Hunziker, 3rd edition, La Grange, Illinois, 1940, page 317.